Figure 1:
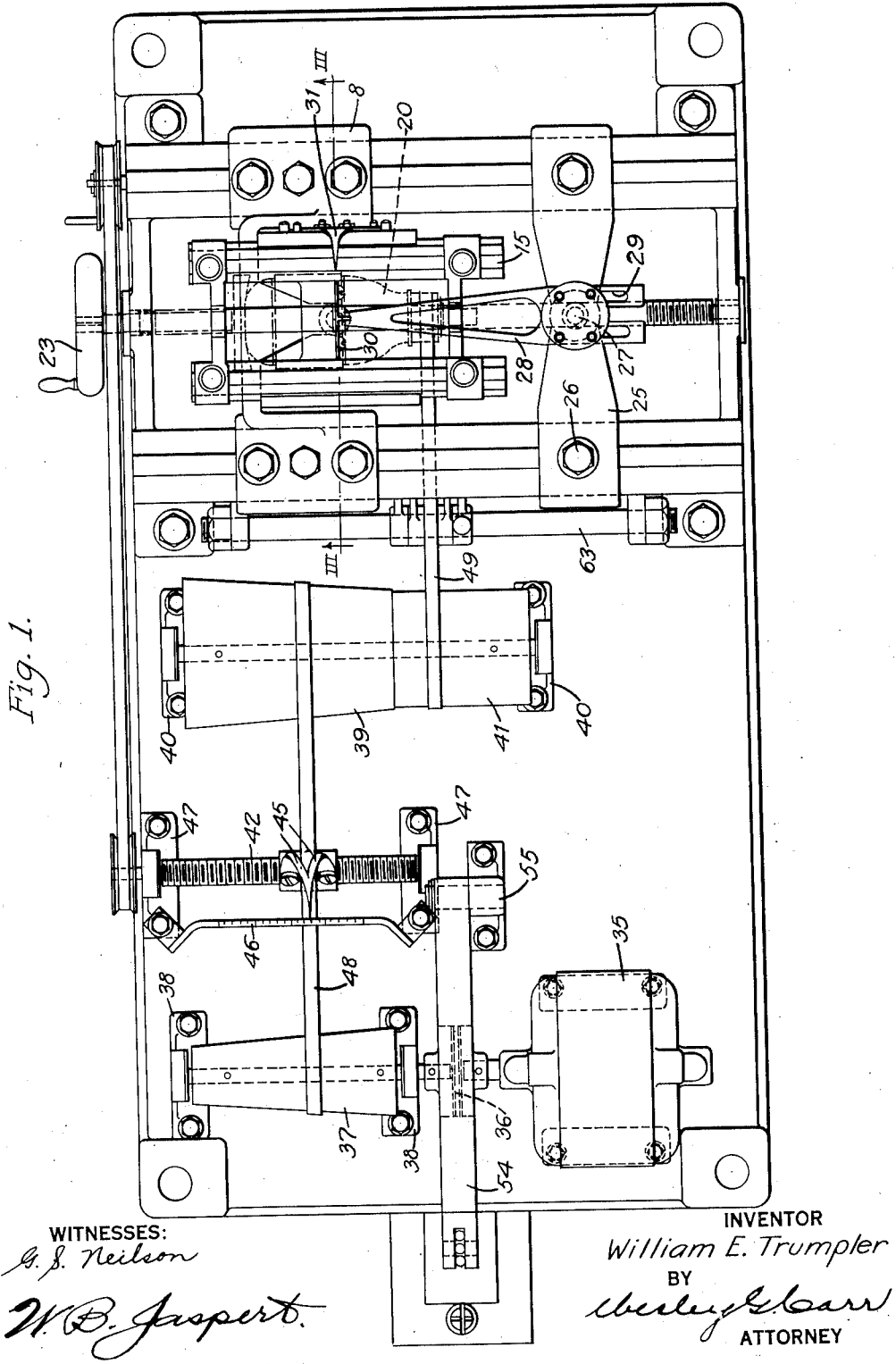

July 3, 1928.

W. E. TRUMPLER

BALANCING MACHINE

Filed Sept. 8, 1924

1,675,393

3 Sheets-Sheet 1

WITNESSES:
G. S. Neilson
W. B. Jaspert.

INVENTOR
William E. Trumpler
BY
ATTORNEY

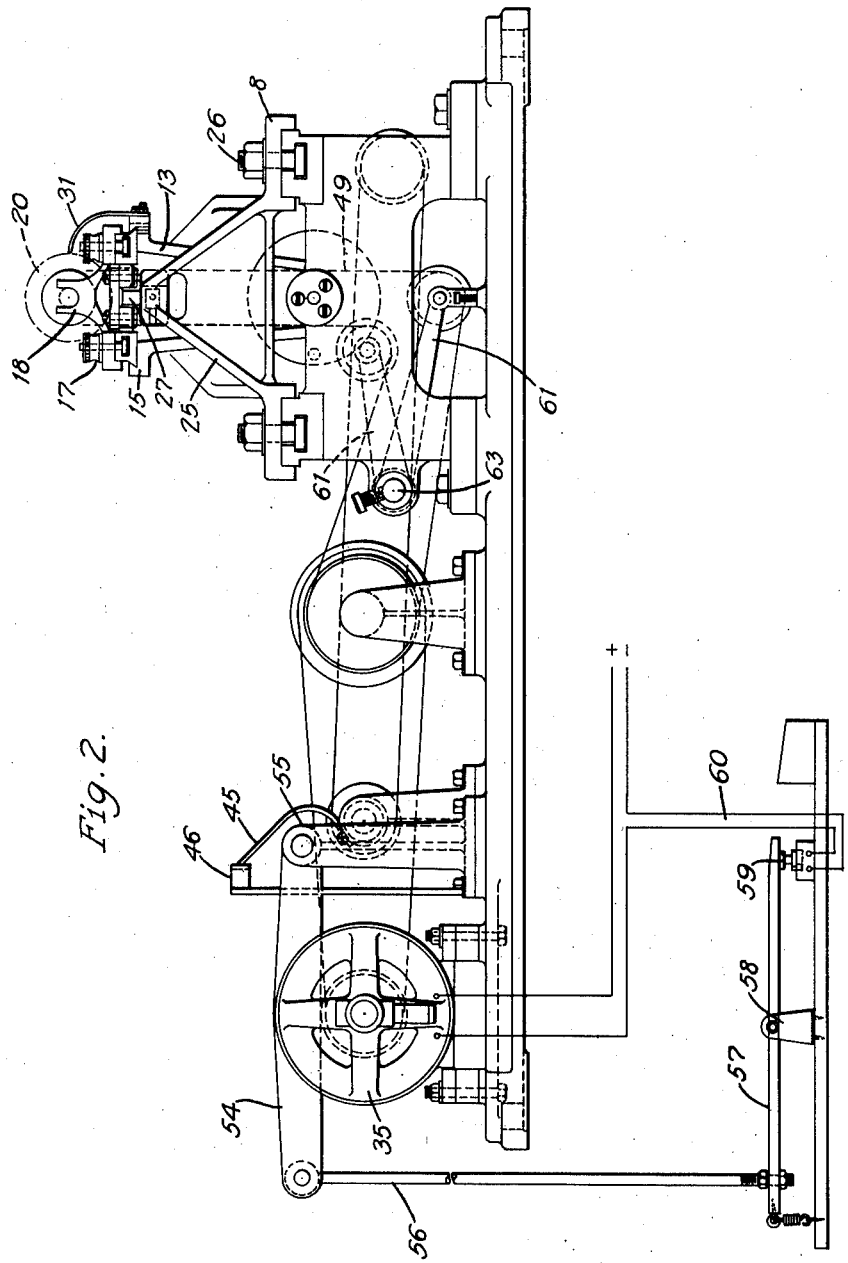

July 3, 1928.
W. E. TRUMPLER
BALANCING MACHINE
Filed Sept. 8, 1924
1,675,393
3 Sheets-Sheet 3
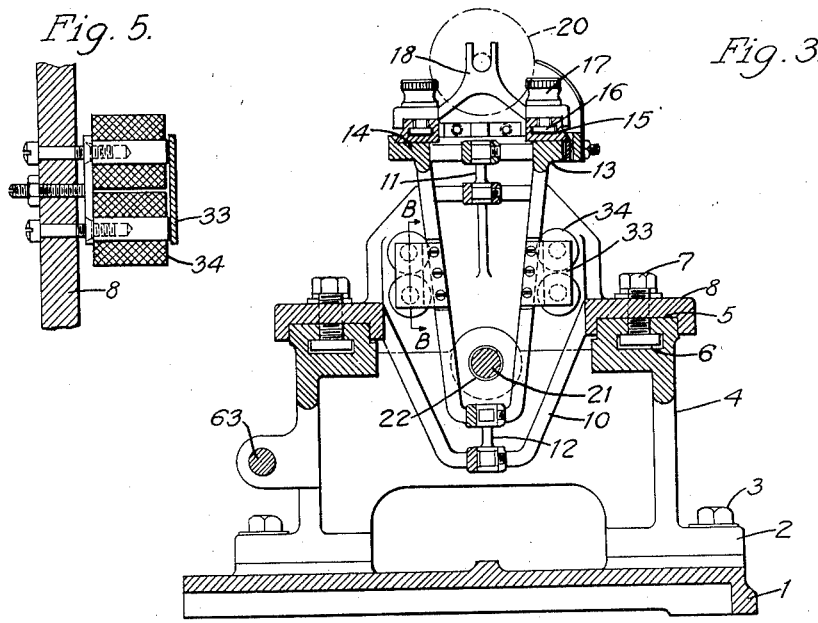
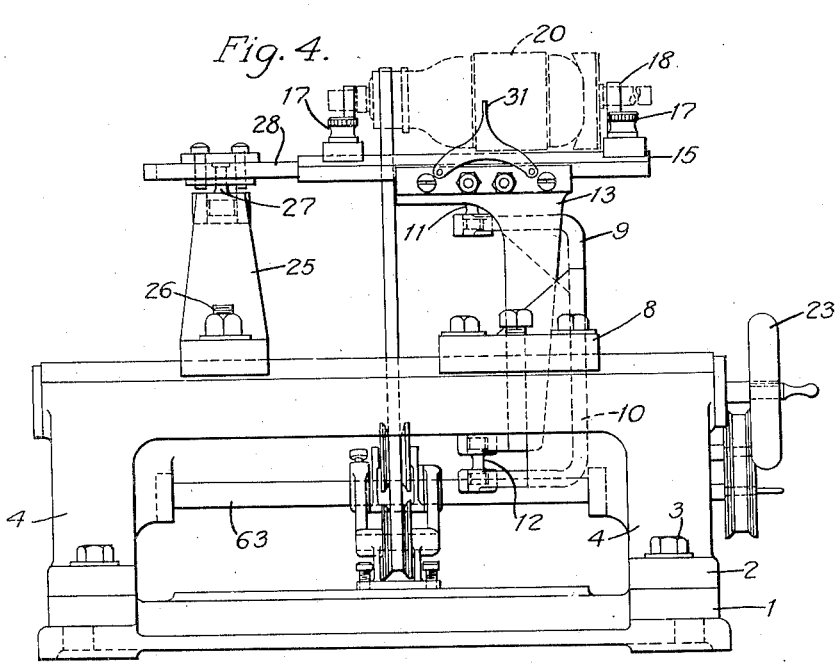
WITNESSES:
G. S. Neilson
M B Jaspert
INVENTOR
William E. Trumpler
BY
Wesley G Barr
ATTORNEY Patented July 3, 1928.

1,675,393

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed September 8, 1924. Serial No. 736,458.

My invention relates to balancing machines for testing the dynamic unbalance of rotors, such as armatures of dynamo-electric machines and the like.

One of the objects of my invention is to provide a balancing machine of simple construction and designed to be responsive to the forces imposed upon it by a rotor that is mounted thereon for testing, and which shall comprise means for indicating such unbalance with mechanical precision and accuracy.

A further object of my invention is to improve the sensitiveness and general usefulness of balancing machines by simplifying the resilient supporting means and improving the quality of the spring elements utilized therefor.

Another object of my invention is the elimination of the frictional resistance of the fulcrums and spring supports and yet maintain the advantage of constant frequency of the machine-bed member for the various fulcrum locations, as hereinafter more fully set forth.

A further object of my invention is to provide a balancing machine which varies from the prior types in that the movable elements are arranged vertically relative to the fulcrum axis, as distinguished from the horizontal arrangement utilized in prior types.

In a copending application, Serial No. 593,732, filed October 11, 1922, I have described a balancing machine which comprises a movable fulcrum member applied to an oscillatory bed that is spring supported upon a base. Such a machine has a constant period of vibration for any location of the fulcrum member along the bed, which is symmetrically supported on the spring members.

My present invention differs from the general design and construction of my prior device principally in the type of spring element and fulcrum which have been materially modified.

I propose to utilize a balancing-machine mechanism comprising a base member having an oscillatable bed supported thereon by means of a plurality of spring members having a fulcrum axis in a vertical direction, which has the advantage over the horizontal type of fulcrum axis in that no deflection takes place by reason of the weight of the bed member or the motor mounted thereon for testing.

The features of construction are such that the rotor to be tested will be readily accessible for handling and manipulation. The construction of this device further obviates the difficulties of vibration and permits adjustment of the fulcrum axis to intersect the axis of rotation of the body to be tested, which eliminates acceleration in the direction of the axis of rotation and the resulting thrust and frictional losses, which increase the damping effect of the vibrating system.

With the vertical-fulcrum arrangement, higher vibration frequencies may be employed, since the acceleration in the horizontal vibration plane need not be smaller than that caused by gravity, which is essential for the horizontal type of vibration axes. The higher frequency is advantageous because it shortens the time of the balancing operation.

The vertical axis permits of a simple drive for the rotor being tested by eliminating the necessity of mounting the driving motor on the vibrating bed. The elimination of this extra weight keeps the inertia of the vibrating bed at a minimum, tending to increase the sensitivity of the machine. Because of the vertical mounting, the vibration of the foundation on which the machine element is mounted is not effective in disturbing the balancing operation as in the horizontal types.

In my above-mentioned co-pending application, the constancy of the frequency of vibration of the vibratable bed member for all fulcrum locations is obtained by spring members symmetrically arranged, relative to the center of gravity of the bed, at a distance therefrom equal to the radius of gyration.

In my present arrangement, I utilize two torsional-spring pivots which serve as both pivots and torsional springs for carrying a fulcrum member that guides the vibrating bed. A third spring pivot is secured by a lever of variable length to the center of gravity of the vibrating bed to hold it in place. With the fulcrum in the center of gravity, this third spring pivot and lever, called "lever spring" hereafter, is inactive and the torsional springs produce a frequncy corresponding to a minimum moment of inertia for the vibrating masses, including the fulcrum member and the vibrating bed. In moving the fulcrum away from the center of gravity, the moment of inertia is increased; at the same time, the lever spring becomes active to produce an addition to the spring scale that is proportional to the increase of the moment of inertia, which maintains the frequency of vibration constant for all fulcrum locations.

The spring pivots that I propose comprise short cylindrical body portions terminating in relatively large cylindrical ends which are rigidly mounted, on one side, upon the fulcrum member. This type of spring reduces the frictional resistance to a minimum, while, in coil springs, frictional resistance is present in the end coils of the spring elements that rest against the support.

In the accompanying drawing constituting a part hereof and in which like reference characters designate like parts:

Figure 1 is a plan view of a balancing machine embodying the principles of my invention, Fig. 2 is a side elevational view thereof, Fig. 3 is a cross sectional view taken along the line III—III Fig. 1, Fig. 4 is an end elevational view thereof, and Fig. 5 is a view in cross-section of the indicating member taken along the line B—B of Fig. 3.

Referring to Fig. 3, the structure therein illustrated comprises a base 1 and a bed plate 2 that is secured thereto by a plurality of bolts 3. The bed plate has projecting side portions 4 that are provided with ways 5 and T-slots 6, the latter being adapted to receive square-head bolts 7 for securing a fulcrum support 8.

The fulcrum support is adapted to move on the ways 5 and to be secured by the bolts 7 for any position of the fulcrum member during the testing operation. The fulcrum support is provided with vertically projecting portions 9 and 10, respectively, which are adapted to receive a pair of spring pivots 11 and 12, which respectively engage portions of an oscillatory supporting member 13.

The upper portion of the member 13 is provided with dove-tailed ways 14 for receiving correspondingly shaped side portions of a bed member 15, which is provided with T slots 16 for thumb screws 17, the latter being adapted to secure a plurality of journal pedestals 18.

The pedestals 18 are adapted to journal a rotor 20 to be balanced. The fulcrum support 8 has an internal screw-thread 21 for engaging a threaded spindle 22, which is provided with a hand-wheel 23 on the end thereof for adjusting the position of the fulcrum member relative to the bed 15 and the rotor 20 to be balanced.

A pedestal 25 is secured to the ways 5 of the bed member by bolts 26, and a torsional spring member 27 is secured in the upper portion of the pedestal 25. A spring arm 28 is adjustably secured to the spring pivot 27 and is provided with elongated openings 29, Fig. 1, to permit longitudinal adjustment thereof. The extended end of the spring arm 28 is secured by flat leaf spring members 30 to the bed 15, preferably at the center of gravity of said bed. At the same time, the spring arm retains the bed member 15 at a fixed location. The oscillatory supporting member 13 is provided with an indicator 31, Figs. 1 and 4, to designate the fulcrum plane, relative to the rotor to be balanced.

A plurality of iron plates 33 are secured to the member 13, and magnet coils 34 are secured to a portion of the support 8 (see Fig. 3 and Fig. 5). These coils and plates constitute part of an amplifying system for indicating the amplitude of vibration of the bed member 15, as disclosed in my copending application, Serial No. 666,026, filed October 1, 1923. The magnets may also be used to produce a damping action on the vibratory bed member by applying short-circuited coils, in accordance with a well-known practice.

The drive mechanism for rotating the rotor to be tested comprises a motor 35, which is mounted on the bed plate and is coupled by a pair of complementary flanges 36 to a cone pulley 37, the latter being journalled for rotation on a pair of pedestal bearings 38. A cone pulley 39 is journalled on pedestals 40 in parallelism with the pulley 37, one end 41 of the pulley 39 being of cylindrical shape. A graduated bar 46 is secured across the pedestals 47 of the shaft member 42 and one of the arms 45 of the yoke is adapted to slide along the scale of the bar 46 to indicate the relative position of the belt 48, which connects the pulleys 37 and 39 to permit of obtaining the desired speed.

The pulley 39 is connected by a belt 49 to the armature or commutator of the rotor 20. The couplings 36 also function as a brake drum. A foot brake co-operating therewith comprises a brake beam 54, which is pivotally mounted on a pedestal 55 and is secured at its other end by a rod 56 to a foot lever 57. The foot lever is pivoted upon a bracket 58 and is adapted to engage a push-button or switch member 59, which is adapted to close an electrical circuit 60 for the drive motor 35 to energize the same simultaneously with the lifting of the brake.

The belt 49 for driving the rotor is disposed around a plurality of suitable guide pulleys, which are mounted on levers 61 that are adjustable along rod 63 to guide the belt side-wise and to maintain the belt under tension to prevent slippage. The arrangement of the belt must be exactly vertical, that is, parallel to the fulcrum axis, to prevent vibrations of the bed due to variations of belt tension.

The operation of this device is briefly as follows: The rotor 20 to be tested is mounted on the journal pedestals 18 and connected by belt 49 to the cylindrical end 41 of the cone pulleys 39. The motor 35 is energized to actuate the drive mechanism for rotating the rotor 20 by actuating the foot lever and releasing the brake. The drive belts are adjusted to regulate the speed of the rotor to obtain a synchronous speed with respect to the period of vibration of the bed member.

The unbalanced or "parasite" mass of the rotor 20 may be determined in the usual manner by a cut and try method of adjustment, that is, by adding or removing material to or from the rotor in the opposite plane to the one or the other of the two balancing planes corresponding to the position of the fulcrum.

It is evident from the above description of my invention that a balancing machine made in accordance therewith provides a simple and efficient means of correcting the "parasite" masses of rotors and that such a device greatly facilitates the balancing operation.

Although I have described a specific embodiment of my invention, it will be obvious to those skilled in the art that various modifications may be made in the details of construction and the size and proportions of the several co-operating parts without departing from the principles herein set forth.

I claim as my invention:

1. A balancing machine comprising a base, a fulcrum support slidingly mounted thereon, a spring support secured to said base, flexible fulcrum members secured to said fulcrum and spring supports, an oscillatable bed supported on said fulcrum support, and means for journalling a body to be tested on said bed.

2. A balancing machine comprising a base, a fulcrum support slidingly mounted thereon, a spring support secured to said base, a plurality of cylindrical fulcrum members secured to said fulcrum and spring supports, an oscillatable bed supported on said fulcrum support, and means for journalling a body to be tested on said bed.

3. A balancing machine comprising a base, a fulcrum support movably mounted thereon, a spring support secured to said base, a plurality of flexible fulcrum members secured to said supports, an oscillatable bed carried by said fulcrum support, means for moving the latter relative to said bed, and means for journalling a rotor to be tested on said bed.

4. A balancing machine comprising a base, a fulcrum support movably mounted thereon, a spring support secured to said base a plurality of flexible members secured to said supports, an oscillatable bed carried by said fulcrum support, means for moving the latter relative to said bed, means for yieldingly restraining movement of said bed, and means for journalling a rotor to be tested on said bed.

5. A balancing machine comprising a base, a fulcrum support movably mounted thereon, a spring support secured to said base, a plurality of flexible fulcrum members secured to said supports, an oscillatable bed carried by said fulcrum support, means for moving the latter relative to said bed, means for adjusting the position of said bed relative to the base, and means for journalling a rotor to be tested on said bed.

6. A balancing machine comprising a base, a fulcrum support movably mounted thereon, a spring support secured to said base, a plurality of flexible fulcrum members secured to said support to permit torsional deflection only, an oscillatable bed carried by said fulcrum support, means for moving the latter relative to said bed, and means for journalling a rotor to be tested on said bed.

7. A balancing machine comprising a base, a fulcrum support movably mounted thereon, a spring support secured thereto, a plurality of torsionally flexing spring fulcrums secured to said supports, an oscillatable bed mounted on said fulcrum support, means for journalling a rotor to be tested on said bed, indicating means for said fulcrum support to indicate the position of the latter relative to said rotor, indicating means for determining the amplitude of vibration of said bed, and means for damping the vibratory movement thereof.

8. A balancing machine comprising a base, a fulcrum support movably mounted thereon, a spring support secured thereto, a plurality of torsionally flexing spring fulcrums secured to said supports, an oscillatable bed mounted on said fulcrum support, means for journalling a rotor to be tested on said bed, indicating means for said fulcrum support to indicate the position of the latter relative to said rotor, and a plurality of solenoids associated with said bed and secured to said fulcrum support to indicate the amplitude of vibration of said bed and to damp the oscillatory movement thereof.

9. A balancing machine comprising a base, a fulcrum support movably mounted thereon, a spring support secured thereto, a plurality of torsionally flexing spring fulcrums secured to said supports, an oscillatable bed mounted on said fulcrum support, means for journalling a rotor to be tested on said bed, indicating means for said fulcrum support to indicate the position of the latter relative to said rotor, a motor mounted on said base, a plurality of cone pulleys and belts for connecting said motor and rotor, and adjusting means for said belts to regulate the speed of said rotor.

10. A balancing machine comprising a base, a fulcrum support movably mounted thereon, a spring support secured thereto, a plurality of torsionally flexing spring fulcrums secured to said supports, an oscillatable bed mounted on said fulcrum support, means for journaling a rotor to be tested on said bed, indicating means for said fulcrum support to indicate the position of the latter relative to said rotor, a plurality of solenoids associated with said bed and secured to said fulcrum support to indicate the amplitude of vibration of said bed and to damp the oscillatory movement thereof, a motor mounted on said base, a plurality of cone pulleys and belts connecting said motor and rotor, and adjusting means for said belts to regulate the speed of said rotor.

11. A balancing machine comprising a bed plate, a fulcrum support movably mounted on said bed plate, spring pivots mounted on said fulcrum support, an oscillatory supporting member mounted upon said spring pivots and an oscillatory bed member movably mounted upon said oscillatory supporting member.

12. A balancing machine comprising a stationary base and a vibratory bed, and electromagnetic damping means for said bed, said means comprising electromagnets secured to said base and bed and adapted to dampen the vibratory movement of said bed without materially influencing the frequency of vibration thereof.

13. A balancing machine comprising a stationary base and a vibratory bed, and electromagnetic damping means for said bed, said means comprising electromagnets having pole faces secured to said base and bed in cooperative working alinement.

14. A balancing machine comprising a stationary base and a vibratory bed, and electromagnetic damping means for said bed, said means comprising electromagnets having pole faces disposed towards each other in co-operative working alinement.

15. A balancing machine comprising a stationary base and a vibratory bed, and electromagnetic damping means for said bed, said means comprising electromagnets having pole faces disposed towards each other in spaced relation and in cooperative working alinement to provide an air-gap therebetween.

16. A balancing machine comprising a base, flexible fulcrum members mounted on said base, an oscillatable bed supported on said fulcrum members and means for damping the vibratory movement of said bed.

17. A balancing machine comprising a base, an oscillatable bed supported thereon, means for journalling a rotor to be tested on said bed, means for rotating said rotor and magnetic means for damping the vibratory movement of said bed while the rotor is rotating.

18. A balancing machine comprising a base, a fulcrum support slidably mounted on the base, a cylindrical fulcrum member carried by said fulcrum support, an oscillatable bed supported on said fulcrum member and means disposed on the bed in which a body to be tested may be journalled.

19. A balancing machine comprising a base, a fulcrum support slidably mounted on the base, a tortionally flexible fulcrum member carried by said fulcrum support, an oscillatable bed supported on said fulcrum member and means disposed on the bed in which a body to be tested may be journalled.

20. A balancing machine comprising a base, a fulcrum support slidably mounted on the base, a plurality of aligned flexible fulcrum members carried by said fulcrum support, an oscillatable bed supported on said fulcrum member and means disposed on the bed in which a body to be tested may be journalled.

21. A balancing machine comprising a base, a fulcrum support slidably mounted on the base, flexible fulcrum members carried by said fulcrum support, an oscillatable bed supported on said fulcrum member and means disposed on the bed in which a body to be tested may be journalled.

22. A balancing machine comprising a base, a tortionally flexible fulcrum member carried by said base, an oscillatable bed supported on said fulcrum member and means disposed on the bed in which a body to be balanced may be journalled.

In testimony whereof, I have hereunto subscribed my name this 3rd day of September, 1924.

WILLIAM E. TRUMPLER.